(12) United States Patent
Suzuki et al.

(10) Patent No.: US 11,472,107 B2
(45) Date of Patent: Oct. 18, 2022

(54) CONTAINER FOR STEREOLITHOGRAPHY APPARATUS

(71) Applicant: KURARAY NORITAKE DENTAL INC., Kurashiki (JP)

(72) Inventors: Kenji Suzuki, Niigata (JP); Hiroyuki Sakamoto, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 229 days.

(21) Appl. No.: 16/622,514

(22) PCT Filed: Jun. 14, 2018

(86) PCT No.: PCT/JP2018/022773
§ 371 (c)(1),
(2) Date: Dec. 13, 2019

(87) PCT Pub. No.: WO2018/230659
PCT Pub. Date: Dec. 20, 2018

(65) Prior Publication Data
US 2020/0207019 A1    Jul. 2, 2020

(30) Foreign Application Priority Data

Jun. 14, 2017 (JP) .............................. JP2017-116634

(51) Int. Cl.
*B29C 64/255* (2017.01)
*B29C 64/135* (2017.01)
(Continued)

(52) U.S. Cl.
CPC .......... *B29C 64/255* (2017.08); *B29C 64/135* (2017.08); *B32B 27/30* (2013.01); *B33Y 30/00* (2014.12); *B33Y 40/00* (2014.12)

(58) Field of Classification Search
CPC .................................................. B29C 64/255
See application file for complete search history.

(56) References Cited

U.S. PATENT DOCUMENTS 4,033,796 A * 7/1977 Burnham .................. H01S 5/24
438/43
2011/0089610 A1* 4/2011 El-Siblani ............. B29C 64/129
264/401
(Continued)

FOREIGN PATENT DOCUMENTS

CN    104416908 A    3/2015
CN    204398334 U    6/2015
(Continued)

OTHER PUBLICATIONS

Acrylite, "Physical Properties of Acrylite", 2001, CYRO, p. 6. https://www.professionalplastics.com/professionalplastics/content/AcryliteFFDataSheet.pdf (Year: 2001).*
(Continued)

*Primary Examiner* — Joseph S Del Sole
*Assistant Examiner* — Margaret B Hayes
(74) *Attorney, Agent, or Firm* — Oblon, McClelland, Maier & Neustadt, L.L.P.

(57) ABSTRACT

The present invention provides a container used in a stereolithography apparatus and having excellent transparency, shape accuracy, and durability. The present invention relates to a container for holding a photocurable composition (3), the container being used in a stereolithography apparatus comprising a container (2), an active energy beam irradiation apparatus (5), and an actuator (8), wherein the container (2) comprises a bottom (2') and a wall, the bottom (2') comprises a first layer (X) comprising a hard resin, a second layer (Y) comprising a soft resin, and a third layer (Z) comprising a fluorine resin, the second layer (Y) is laminated on the first layer (X) and the third layer (Z) is laminated on the second layer (Y), the pencil hardness measured according to JIS K 5600-5-4:1999 for the first layer (X) is 3 B or harder, the hardness measured for the second layer (Y) using a type A durometer compliant with (Continued)

JIS K 6253-3:2012 is 10 to 90, and the third layer (Z) has a thickness of 0.1 to 5.0 mm.

5 Claims, 1 Drawing Sheet

(51) Int. Cl.
  *B32B 27/30* (2006.01)
  *B33Y 30/00* (2015.01)
  *B33Y 40/00* (2020.01)

(56) References Cited

U.S. PATENT DOCUMENTS

| | | | |
|---|---|---|---|
| 2015/0001763 A1 | 1/2015 | Elsey | |
| 2015/0044319 A1 | 2/2015 | Sakurai | |
| 2015/0064298 A1 | 3/2015 | Syao | |
| 2015/0123319 A1 | 5/2015 | Fortunato et al. | |
| 2017/0334129 A1 | 11/2017 | Ebert et al. | |
| 2018/0126644 A1* | 5/2018 | Slaczka | F28F 21/084 420/548 |
| 2019/0111616 A1 | 4/2019 | Watanabe | |

FOREIGN PATENT DOCUMENTS

| | | |
|---|---|---|
| CN | 205167579 U | 4/2016 |
| EP | 3 538 367 A1 | 9/2019 |
| JP | 56-144478 A | 11/1981 |
| JP | 60-247515 A | 12/1985 |
| JP | 2009-34938 A | 2/2009 |
| JP | 2015-33826 A | 2/2015 |
| JP | 3 023 226 A1 | 5/2016 |
| JP | 2016-91973 A | 5/2016 |
| JP | 2016-97626 A | 5/2016 |
| JP | 2016-172450 A | 9/2016 |
| JP | 2016-530125 A | 9/2016 |
| JP | 2016-190205 A | 11/2016 |
| JP | 2017-159621 A | 9/2017 |
| WO | WO 2012/054099 A1 | 4/2012 |
| WO | WO 2017/085648 A2 | 5/2017 |
| WO | WO 2017/169493 A1 | 10/2017 |
| WO | WO 2018/089526 A1 | 5/2018 |

OTHER PUBLICATIONS

Wacker, "ELASTOSIL® RT 601 A/B", 2020, Wacker, p. 2. https://www.wacker.eom/h/en-us/medias/ELASTOSIL-RT-601-AB-en-2020.07.01.pdf (Year: 2020).*
International Search Report dated Aug. 7, 2018 in corresponding PCT Application No. PCT/JP2018/022773 filed on Jun. 14, 2018, 2 Pages.
Chinese Office Action dated Feb. 20, 2021 in Chinese Patent Application No. 201880039524.8 (with unedited computer generated English translation), 12 pages.
Zhou, et al., eds., Chemical Industry Publishing Co., Ltd., p. 129, Aug. 2003, 3 pages.
Extended European Search Report dated Feb. 5, 2020 in corresponding European Patent Application No. 18816989.0, 11 pages.
Chinese Office Action dated Dec. 9, 2021 in Chinese Patent Application No. 201880039524.8 (with English translation), 13 pages.
Nie Chunhui, et al., eds., "Film Mechanical Modeling" Beijing United Publishing Company, Jul. 2015, pp. 105-106.
European Office Action dated Mar. 31, 2022 in European Patent Application No. 18816989.0, 5 pages.

* cited by examiner

CONTAINER FOR STEREOLITHOGRAPHY APPARATUS

TECHNICAL FIELD

The present invention relates to a container used in a stereolithography apparatus and having excellent transparency, shape accuracy, and durability.

BACKGROUND ART

Patent Literature 1 discloses a method for producing a three-dimensional object by repeating a step in which a liquid, photocurable resin is exposed to a necessary amount of controlled light energy to cure the liquid, photocurable resin into the form of a thin layer, on which the liquid, photocurable resin is further provided and subjected to controlled light irradiation to cure the liquid, photocurable resin into the form of a thin layer on the previously cured thin layer. This method is what is called stereolithographic modeling. Patent Literature 2 proposed a basic method for practical application of this technique, and, since the proposal, many other optical three-dimensional modeling techniques have been proposed.

In a typical method commonly adopted to optically produce three-dimensional objects, the surface of a liquid, photocurable composition placed in a container is selectively irradiated with a computer-controlled ultraviolet laser beam so that a desired pattern will be drawn thereon and the irradiated portion will be cured to have a given thickness. The liquid, photocurable composition for another layer is provided on the cured layer and irradiated with an ultraviolet laser beam in the same manner as described above so as to be cured. This lamination operation for forming continuous cured layers is repeated to produce a three-dimensional object having a final shape. This technique has attracted great interest recently because the technique allows easy production of an intended three-dimensional object, even with a very complex shape, in a relatively short time period. In particular, a constrained surface method, in which a platform from which an object is suspended is lifted when a three-dimensional object is in production by lamination, is becoming common because this method does not require too much amount of a photocurable composition.

However, in the constrained surface method, an object formed on a platform approaches the vicinity of a container of a photocurable composition, and thus, for example, deformation of the object and breakage of the container are likely to happen. Additionally, some of photocurable compositions disadvantageously damage and deteriorate a container by penetration into or sticking to the container.

Under these circumstances, various techniques have been proposed that prevent breakage and deterioration of a container. For example, Patent Literature 3 proposes a method for avoiding a sudden contact by a stepwise approach of a platform in the vicinity of the container. Patent Literature 4 describes a method in which a silicone layer is provided on the surface of a container to reduce sticking of resins. Patent Literature 5 describes an example in which a fluorosilicon mold release agent is applied to the surface of a PET film to impart the mold releasability. Patent Literature 6 describes a stereolithography apparatus having a given tank including a transparent elastic layer, transparent film, transparent low-surface-energy protective film, and the like.

CITATION LIST

Patent Literature

Patent Literature 1: JP S56(1981)-144478 A
Patent Literature 2: JP S60(1985)-247515 A
Patent Literature 3: JP 2016-172450 A
Patent Literature 4: JP 2015-33826 A
Patent Literature 5: JP 2009-34938 A
Patent Literature 6: JP 2016-530125 A

SUMMARY OF INVENTION

Technical Problem

The method described in Patent Literature 3 cannot reduce penetration of photocurable compositions into a container and sticking of photocurable compositions to the container. The silicone layer of Patent Literature 4 cannot achieve its effect sufficiently against a particularly-low-polarity photocurable composition, photocurable composition containing a relatively-low-molecular-weight polymerizable monomer, or photocurable silicone composition. The method described in Patent Literature 5 has a problem in that photocurable compositions can be contaminated by the mold release agent. The tank described in Patent Literature 6 leaves room for further improvement in terms of the shape accuracy and durability.

It is, therefore, an object of the present invention to provide a container used in a stereolithography apparatus and having excellent transparency, shape accuracy, and durability.

Solution to Problem

The present disclosure relates to the following inventions. A container for holding a photocurable composition (3), the container being used in a stereolithography apparatus comprising a container (2), an active energy beam irradiation apparatus (5), and an actuator (8), wherein the container (2) comprises a bottom (2') and a wall,
the bottom (2') comprises a first layer (X) comprising a hard resin, a second layer (Y) comprising a soft resin, and a third layer (Z) comprising a fluorine resin,
the second layer (Y) is laminated on the first layer (X) and the third layer (Z) is laminated on the second layer (Y),
the pencil hardness measured according to JIS K 5600-5-4:1999 for the first layer (X) is 3B or harder,
the hardness measured for the second layer (Y) using a type A durometer compliant with JIS K 6253-3:2012 is 10 to 90, and
the third layer (Z) has a thickness of 0.1 to 5.0 mm.

The container described above, wherein the hard resin is at least one selected from the group consisting of acrylic, polycarbonate, polyester, polystyrene, polypropylene, polymethylpentene, and polycycloolefin.

The container described above, wherein the soft resin is at least one selected from the group consisting of a silicone, an acrylic elastomer, a polyolefin elastomer, and a styrene elastomer.

The container described above, wherein the thickness of the first layer (X) is a 0.5 to 25 mm and the thickness of the second layer (Y) is 0.01 to 25 mm.

The container described above, wherein the second layer (Y) is 0.1 to 5 times thicker than the first layer (X) and the third layer (Z) is 0.01 to 5 times thicker than the second layer (Y).

The container described above, wherein [the area (cm²) of a bottom face (2'a) on an inner face side of the container (2)]/[the thickness (cm) of the bottom (2')] is 100 to 10000 cm.

Advantageous Effects of Invention

The container of the present invention has excellent transparency, shape accuracy, and durability. Therefore, penetration of photocurable compositions into the container and sticking of photocurable compositions to the container can be reduced and modeling can be carried out repeatedly with the same container. Moreover, objects having good shape accuracy can be obtained with the use of the container of the present invention. Furthermore, stereolithographic modeling can be carried out with the container of the present invention capable of holding various types of photocurable compositions.

DESCRIPTION OF EMBODIMENTS

A stereolithography apparatus in which a container of the present invention is used will be described with reference to an apparatus (1) shown in FIG. 1.

Figure 1:
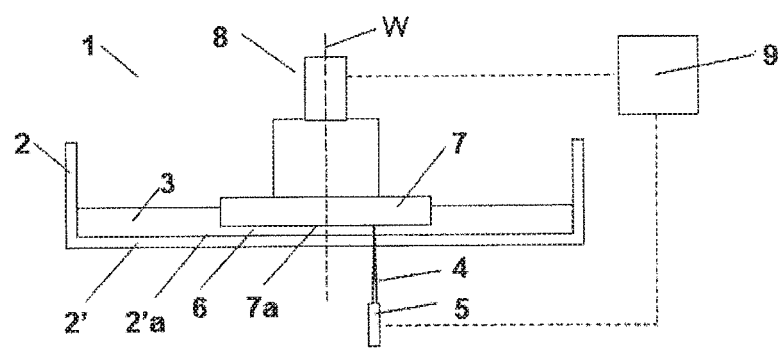
FIG. 1 is a schematic diagram showing an embodiment of a stereolithography apparatus (1) according to the present invention and a container (2) used in the apparatus.

In FIG. 1, a stereolithography apparatus (1) comprises a container (2) (the container of the present invention) for holding a photocurable composition (3) cured by irradiation of an active energy beam (4).

The stereolithography apparatus (1) in which the container of the present invention is used comprises an active energy beam irradiation apparatus (5) emitting the active energy beam (4). In the vicinity of the bottom face (2'a) of the container (2), the active energy beam irradiation apparatus (5) can selectively irradiate the photocurable composition (3) held in the container (2) with the active energy beam (4) from the bottom (2') side.

Figure 2:
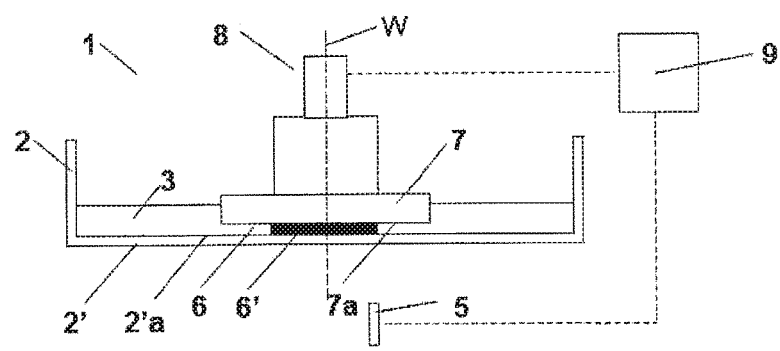
FIG. 2 is a schematic diagram relating to a method for producing three-dimensional objects using the stereolithography apparatus (1) and container (2) according to the present invention.

As schematically shown in FIG. 2, irradiation of a portion (6) included in the photocurable composition (3) and located between the bottom (2') and object production plate (7) with the active energy beam (4) forms a solidified layer (6') at the irradiated portion (under the object production plate (7)).

The stereolithography apparatus (1) also comprises an actuator (8) suitable for moving the solidified layer (6') formed under the object production plate (7) with respect to the bottom (2') of the container (2) along a direction W perpendicular to the bottom (2').

The object production plate (7) comprises a face (7a) facing the bottom (2') of the container (2). The object production plate (7) supports the solidified layer (6') at the face (7a).

The stereolithography apparatus (1) also comprises a logic circuit control (9) operationally connected to the active energy beam irradiation apparatus (5) and actuator (8). With the use of the logic circuit control (9), irradiation of the portion (6) included in the photocurable composition (3) and located between the bottom (2') and object production plate (7) with the active energy beam is controlled from the bottom (2') side.

An exemplary motion of the stereolithography apparatus (1) in which the container of the present invention is used will be described below. First, as a first positioning motion, the face (7a) of the object production plate (7) is moved to the vicinity of the bottom (2') of the container (2) by means of the actuator (8). Next, when the face (7a) reaches a position at which there is a given distance from the bottom face (2'a) on the inner face side of the container (2), the portion (6) of the photocurable composition (3) is irradiated with the active energy beam (4) by the active energy beam irradiation apparatus (5) to form a first solidified layer (6') at the irradiated portion. Subsequently, the actuator (8) moves the first solidified layer (6') away from the bottom (2') of the container (2) by an upward motion. In order to form a continuously solidified layer, the first solidified layer (6') is moved to the vicinity of the bottom (2') of the container (2) by a second positioning motion same as the first positioning motion. By the above upward motion and second positioning motion, the photocurable composition (3) is provided between the first solidified layer (6') and bottom (2'). The portion included in the photocurable composition (3) and located between the first solidified layer (6') and bottom (2') is irradiated with the active energy beam (4) in the same manner as above to form a second solidified layer at the irradiated portion. The second solidified layer is supported by the face of the first solidified layer (6') which has already been solidified and faces the bottom (2'). Further, the second solidified layer is moved away from the bottom (2') of the container (2) as the first solidified layer (6') was. Subsequently, the second solidified layer is moved to the vicinity of the bottom (2') of the container (2) by a third positioning motion. The above motions are repeated likewise. A three-dimensional object in which solidified layers form a continuous layer can be obtained by a constrained surface method as described above. Another embodiment of the present invention is a method for producing three-dimensional objects using the container (2).

The container (2) of the present invention will be described with reference to FIG. 3.

Figure 3:
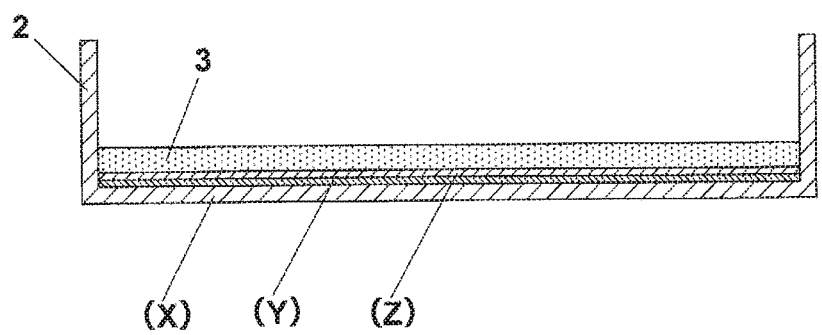
FIG. 3 is an enlarged view of the container (2) shown in FIG. 1.

In an embodiment shown in FIG. 3, the container (2) of the present invention used in a stereolithography apparatus comprises the bottom (2') having a three-layered flat laminate structure. The bottom (2') comprises, from the side irradiated with the active energy beam, a first layer (X) comprising a hard resin, a second layer (Y) laminated on the first layer (X) and comprising a soft resin, and a third layer (Z) laminated on the second layer (Y) and comprising a fluorine resin. The liquid, photocurable composition (3) is held in the container (2). The material of a wall portion jointed to the bottom (2') of the container (2) is not especially limited, and is preferably the same as that of the first layer (X) in terms of ease of production.

First Layer (X) Comprising Hard Resin

A hard resin that is transparent and not flexible is suitably used as the material composing the first layer (X) of the bottom (2') of the container (2) of the present invention. Specific examples of the hard resin used as the first layer (X) include acrylic (such as polymethyl methacrylate), polycarbonate, polyester (such as polyethylene terephthalate), polystyrene, polypropylene, polymethylpentene, and polycycloolefin. Among these, acrylic and polycarbonate are preferred in terms of the transparency, strength, and durability. One of these hard resins may be used alone, or two or more thereof may be used in combination.

The scratch hardness (which is herein referred to as "pencil hardness") measured according to JIS K 5600-5-4: 1999 (pencil method) for the first layer (X) needs to be 3 B or harder and is preferably 2 B or harder, more preferably 1 B or harder, and even more preferably F or harder, so as to maintain the shape as a container.

The thickness of the first layer (X) is preferably 0.5 to 25 mm, more preferably 0.75 to 10 mm, even more preferably 0.75 to 7.5 mm, and the most preferably 1.0 to 5.0 mm, in terms of the durability, strength, and transparency.

Second Layer (Y) Comprising Soft Resin

A transparent soft resin is suitably used as the material composing the second layer (Y) of the bottom (2') of the container (2) of the present invention. Specific examples of the soft resin used as the second layer (Y) include a silicone, an acrylic elastomer, a polyolefin elastomer, and a styrene elastomer. Among these, a silicone is preferred in terms of the transparency and pliability. One of these soft resins may be used alone, or two or more thereof may be used in combination.

The hardness measured for the second layer (Y) using a type A durometer compliant with JIS K 6253-3:2012 needs to be 10 to 90 and is preferably 20 to 80 and more preferably 30 to 70.

The thickness of the second layer (Y) is preferably 0.01 to 25 mm, more preferably 0.1 to 10 mm, even more preferably 0.25 to 7.5 mm, and most preferably 0.5 to 5.0 mm, in terms of the pliability and transparency.

Third Layer (Z) Comprising Fluorine Resin

A transparent fluorine resin is suitably used as the material composing the third layer (Z) of the bottom (2') of the container (2) of the present invention. Specific examples of the fluorine resin used as the third layer (Z) include polytetrafluoroethylene (PTFE), polychlorotrifluoroethylene (PCTFE), polyvinylidene fluoride (PVDF), polyvinyl fluoride (PVF), perfluoroalkoxy resins (PFA), tetrafluoroethylene-hexafluoropropylene copolymers (FEP), ethylene-tetrafluoroethylene copolymers (ETFE), and ethylene-chlorotrifluoroethylene copolymers (ECTFE). Among these, in terms of the transparency and releasability, polytetrafluoroethylene (PTFE), perfluoroalkoxy resins (PFA), tetrafluoroethylene-hexafluoropropylene copolymers (FEP), and ethylene-tetrafluoroethylene copolymers (ETFE) are preferred and tetrafluoroethylene-hexafluoropropylene copolymers (FEP) and ethylene-tetrafluoroethylene copolymers (ETFE) are more preferred. One of these fluorine resins may be used alone, or two or more thereof may be used in combination.

The thickness of the third layer (Z) needs to be 0.1 to 5.0 mm not only in terms of the pliability and transparency but also in terms of the shape accuracy and durability. The container of the present invention has excellent shape accuracy in spite of the relatively large thickness of the third layer (Z). The thickness of the third layer (Z) is preferably 0.15 to 2.5 mm, more preferably 0.2 to 1.5 mm, and even more preferably 0.25 to 1.0 mm.

For the bottom (2') of the container (2) of the present invention, it is preferable that the second layer (Y) is 0.1 to 5 times thicker than the first layer (X) and the third layer (Z) is 0.01 to 5 times thicker than the second layer (Y), it is more preferable that the second layer (Y) is 0.1 to 5 times thicker than the first layer (X) and the third layer (Z) is 0.01 to 1 times thicker than the second layer (Y), and it is even more preferable that the second layer (Y) is 0.2 to 4 times thicker than the first layer (X) and the third layer (Z) is 0.02 to 0.8 times thicker than the second layer (Y), in terms of obtaining objects with good shape accuracy.

[The area ($cm^2$) of a bottom face (2'a) on an inner face side of the container (2) of the present invention]/[the thickness (cm) of the bottom (2')] is preferably 100 to 10000 cm, more preferably 200 to 8000 cm, even more preferably 300 to 6000 cm, and, in terms of better shape accuracy and better durability, particularly preferably 400 to 3000 cm.

The bottom (2') of the container (2) of the present invention may comprise an additional layer other than the first layer (X), second layer (Y), and third layer (Z) without departing from the spirit of the present invention. Examples of the additional layer include an adhesive layer for imparting the adhesiveness to its neighboring layer and a coating layer for preventing the outer face of the first layer (X) from being scratched. The thickness of each of these additional layers is preferably 0.1 mm or less, more preferably 0.05 mm or less, and even more preferably 0.01 mm or less.

The bottom (2') of the container (2) of the present invention has the three-layered structure described above. As long as the photocurable composition (3) can be held in the container (2), the shape, size, and the like of the container (2) are not especially limited, and can be decided depending on the intended use thereof.

A method for producing the container (2) of the present invention is not especially limited, and one example thereof is as follows. First, hard resin sheets each having a desired shape are cut out of a sheet-shaped hard resin and bonded together with an adhesive to produce a frame of the container (2). Alternatively, a frame of the container (2) can be produced by press molding. The first layer (X) forming the bottom (2') of the container (2) and comprising a hard resin can thus be obtained. Next, the second layer comprising a soft resin is laminated on the first layer (X). For example, when a silicone resin is used as the soft resin, a method in which a two-component curable material is mixed, poured into the above frame, and allowed to be cured, a method in which a soft resin layer is formed by solution casting, or the like can be employed. Finally, the third layer (Z) comprising a fluorine resin is laminated on the second layer (Y). For this lamination, for example, a method in which a film-shape fluorine resin is cut to have a desired size and the resultant fluorine resin film is bonded onto the second layer (Y) can be employed. Additionally, entry of the photocurable composition (3) can be prevented by coating the edge of the film with a soft resin.

Any known light source may be used in stereolithographic modeling using the stereolithography apparatus (1) and container (2) according to the present invention. Among the known light sources, an active energy beam is used in the present invention as the energy used to cure the photocurable composition (3). The term "active energy beam" means an energy beam capable of curing the photocurable composition (3), and examples of the active energy beam include ultraviolet light, an electron beam, X-ray, radiant ray, and high-frequency electromagnetic wave. For example, the active energy beam may be ultraviolet light having a wavelength of 300 to 400 nm. Examples of the light source of the active energy beam include: lasers such as an Ar laser and He—Cd laser; and lighting devices such as a halogen lamp, xenon lamp, metal halide lamp, LED light, mercury lamp, and fluorescent lamp. Lasers are particularly preferred. The use of a laser as the light source makes it possible to reduce the modeling time by increasing the energy level and also to obtain accurately modeled three-dimensional objects by taking advantage of a desirable convergence of a laser beam.

The present invention encompasses embodiments obtainable by combining the above features in various manners within the technical scope of the present invention as long as the effect of the present invention can be obtained.

EXAMPLES

Hereinafter, the present invention will be described in more detail by way of examples. The present invention is by no means limited by these examples and can be modified in various ways by those ordinarily skilled in the art within the technical scope of the invention. The materials of the containers according to Examples or Comparative Examples used in a stereolithography apparatus will be described hereinafter along with abbreviations of the materials.

[First Layer (X) Comprising Hard Resin]
PMMA: polymethyl methacrylate, PARAPET GH-S (manufactured by KURARAY CO., LTD.)
PC: polycarbonate, Iupilon S2000 (manufactured by Mitsubishi Engineering-Plastics Corporation)

[Second Layer (Y) Comprising Soft Resin]
Silicone 1: two-component curable silicone resin, KE-103/CAT-103 (manufactured by Shin-Etsu Chemical Co., Ltd.)
Silicone 2: two-component curable silicone resin, KE 1603A/B (manufactured by Shin-Etsu Chemical Co., Ltd.)

[Third Layer (Z) Comprising Fluorine Resin]
FEP: tetrafluoroethylene-hexafluoropropylene copolymer (manufactured by DAIKIN INDUSTRIES, LTD.)
ETFE: ethylene-tetrafluoroethylene copolymer (manufactured by DAIKIN INDUSTRIES, LTD.)

Example 1

A 33-mm-high and 244-mm-square PMMA container whose bottom face has a thickness of 1.0 mm and an area of 484 $cm^2$ was produced from a 12-mm-thick and 30-mm-wide PMMA prism and a 1.0-mm-thick and 244-mm-square PMMA sheet (the pencil hardness measured according to JIS K 5600-5-4:1999 was 3H).

Next, into a polypropylene disposable cup were put 100 g of KE-103 and 5.0 g of CAT-103, which were manually stirred for 1 minute using a spatula to obtain a silicone 1. An amount of 25 g of the silicone 1 was poured into the above PMMA container, spread over the entire bottom face thereof with a spatula, left for 24 hours, and then heated at 70° C. for 6 hours to form a soft resin layer. The hardness measured using a type A durometer (ASKER Durometer Type A manufactured by KOBUNSHI KEIKI CO., LTD.) compliant with JIS K 6253-3:2012 for the soft resin layer was 50. The thickness of the soft resin layer was 0.5 mm.

Furthermore, a 0.25-mm-thick and 215-mm-square FEP sheet was placed on the soft resin layer in such a manner that air is not trapped therebetween. The silicone 1 was applied to the edge of the FEP sheet and cured so that a photocurable composition would not enter under the FEP sheet. A container was thus obtained.

Example 2

A container was produced in the same manner as in Example 1, except that the thickness of the PMMA sheet, namely, the thickness of the first layer (X) was changed to 5.0 mm, the amount of the silicone 1 poured into the PMMA container was changed to 250 g, and the thickness of the FEP sheet was changed to 0.5 mm. The hardness measured using a type A durometer compliant with JIS K 6253-3:2012 for the soft resin layer was 50. The thickness of the soft resin layer was 5.0 mm.

Example 3

A container was produced in the same manner as in Example 1, except that PMMA was changed to PC (the pencil hardness measured according to JIS K 5600-5-4:1999 for the PC sheet was F), the thickness of the first layer (X) was changed to 3.0 mm, the silicone 1 was changed to the silicone 2, the amount of the silicone 2 poured into the PC container was changed to 50 g, and the 0.25-mm-thick FEP sheet was changed to a 0.75-mm-thick ETFE sheet. The hardness measured using a type A durometer compliant with JIS K 6253-3:2012 for the soft resin layer was 60. The thickness of the soft resin layer was 1.0 mm.

Comparative Example 1

A PMMA container as produced in Example 1 was used directly and not provided with the second layer (soft resin layer) and third layer.

Comparative Example 2

A container was produced in the same manner as in Example 1, except that no FEP sheet was attached.

Comparative Example 3

A container was produced in the same manner as in Example 1, except that no coating of the silicone 1 was provided.

Comparative Example 4

A container was produced in the same manner as in Example 1, except that PMMA was changed to an acrylic elastomer, KURARITY L2250 (manufactured by KURARAY CO., LTD.) (the pencil hardness measured according to JIS K 5600-5-4:1999 for a sheet made of the acrylic elastomer was softer than 3 B, and the thickness of the acrylic elastomer sheet was 1.0 mm). The hardness measured using a type A durometer compliant with JIS K 6253-3:2012 for the soft resin layer was 50. The thickness of the soft resin layer was 0.5 mm.

[Photocurable Compositions]
Photocurable compositions obtained by the following production methods were used for evaluation of the shape accuracy and durability.

Photocurable Composition 1:
In a sample bottle were put 50 g of 2,2,4-trimethylhexamethylenebis(2-carbamoyloxyethyl)dimethacrylate (manufactured by Shin-Nakamura Chemical Co., Ltd.), 50 g of N-acryloylmorpholine (manufactured by KJ Chemicals Corporation), 2.0 g of 2,4,6-trimethylbenzoyldiphenylphosphine oxide (manufactured by Wako Pure Chemical Industries, Ltd.), and 0.05 g of 3,5-di-t-butyl-4-hydroxytoluene (manufactured by Wako Pure Chemical Industries, Ltd.), which were stirred at 40° C. for 24 hours to obtain a photocurable composition 1.

Photocurable Composition 2:
In a sample bottle were put 70 g of 2,2-bis(4-methacryloyloxypolyethoxyphenyl)propane (manufactured by Shin-Nakamura Chemical Co., Ltd.), 30 g of dodecyl acrylate (manufactured by Kyoeisha Chemical Co., Ltd.), 2.0 g of 2,4,6-trimethylbenzoyldiphenylphosphine oxide (manufactured by Wako Pure Chemical Industries, Ltd.), and 0.05 g of 3,5-di-t-butyl-4-hydroxytoluene (manufactured by Wako Pure Chemical Industries, Ltd.), which were stirred at 40° C. for 24 hours to obtain a photocurable composition 2.

<Transparency>

The transparency ΔL was measured for the bottom faces of the containers according to Examples and Comparative Examples shown in Table 1 using a spectrophotometer (SE 2000 (compliant with JIS Z 8722:2009) manufactured by NIPPON DENSHOKU INDUSTRIES CO., LTD.; 0 to 45° post dispersive; illuminant D65). The transparency ΔL is defined by the following formula.

$$\Delta L = L^*W - L^*B$$

(In the formula, L*W represents the lightness L* in the L*a*b* color system as measured against a white background according to JIS Z 8781-4:2013, and L*B represents the lightness L* in the L*a*b* color system as measured against a black background according to JIS Z 8781-4: 2013.)

A transparency (ΔL) of 95 or more is defined as acceptable to ensure high modeling performance. Table 1 shows the results.

<Shape Accuracy>

Cubic objects 10.0 mm on a side were produced from the photocurable compositions 1 and 2 using the containers according to Examples and Comparative Examples shown in Table 1 and a stereolithography apparatus (DigitalWax (registered trademark) 028J-Plus manufactured by DWS). Each object was washed with methanol to remove unpolymerized monomers and was then measured for dimensions (unit: mm) using a micrometer. A shape error was calculated using the following formula.

Shape error (%)=100×(|(measured dimensions)−10.0|)/10.0

When the shape error of the object is 5.0% or less, the shape accuracy thereof is acceptable. When the shape error is 4.0% or less, the shape accuracy is better. When the shape error is 3.5% or less, the shape accuracy is much better.

<Durability>

Cubic objects 10.0 mm on a side were produced from the photocurable compositions 1 and 2 using the containers according to Examples and Comparative Examples shown in Table 1 and a stereolithography apparatus (DigitalWax (registered trademark) 028J-Plus manufactured by DWS). After the completion of the modeling, the objects were removed. Modeling was carried out repeatedly under the same conditions until the bottom faces of the containers were damaged. The greater the number of times modeling can be completed is, the better the durability is.

TABLE 1

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
| Container | Material of first layer (X) |  | PMMA | PMMA | PC | PMMA | PMMA | PMMA | Elastomer |
|  | Material of second layer (Y) |  | Silicone 1 | Silicone 1 | Silicone 2 |  | Silicone 1 |  | Silicone 1 |
|  | Material of third layer (Z) |  | FEP | FEP | ETFE |  |  | FEP | FEP |
|  | Thickness (mm) of first layer (X) |  | 1.0 | 5.0 | 3.0 | 1.0 | 1.0 | 1.0 | 1.0 |
|  | Thickness (mm) of second layer (Y) |  | 0.5 | 5.0 | 1.0 |  | 0.5 |  | 0.5 |
|  | Thickness (mm) of third layer (Z) |  | 0.25 | 0.5 | 0.75 |  |  | 0.25 | 0.25 |
|  | Area (cm²) of bottom face/thickness (cm) of bottom |  | 2765 | 460 | 1020 | 4840 | 3230 | 3870 | 2765 |
| Properties | Transparency | ΔL | 99 | 97 | 99 | 99 | 99 | 99 | 98 |
|  | Shape error (%) | Photocurable composition 1 | 2.2 | 3.2 | 2.2 | Modeling not completed | 8.4 | 12.3 | 11.4 |
|  |  | Photocurable composition 2 | 2.4 | 3.5 | 2.4 | 11.8 | Modeling not completed | 14.5 | 13.2 |
|  | Durability Number of times modeling can be completed | Photocurable composition 1 | 28 | 32 | 28 | 0 | 1 | 1 | 1 |
|  |  | Photocurable composition 2 | 31 | 33 | 31 | 1 | 0 | 1 | 1 |

As shown in Table 1, the containers according to Examples 1 to 3 had excellent transparency, were able to reduce penetration of the photocurable compositions into the containers and sticking of the photocurable compositions to the containers, were reusable, and had excellent durability. Moreover, the objects were modeled with high accuracy with the use of the containers and had excellent shape accuracy. On the other hand, the objects were clung to the containers according to Comparative Examples 1 to 4. The bottoms of the containers were torn and modeling could not be completed, or modeling could not be completed with the same containers two or more times. Even in the case where modeling could be completed, the shape accuracy was inferior. Additionally, according to the present invention, the types of photocurable compositions usable for modeling are not limited, unlike Comparative Examples 1 and 2, and stereolithographic modeling can be carried out with the container according to the present invention capable of holding various types of photocurable compositions including, for example, photocurable compositions containing a relatively-low-molecular-weight (for example, a molecular weight of 2000 or less) polymerizable monomer and photocurable compositions containing a silicone resin.

INDUSTRIAL APPLICABILITY

Having excellent transparency, shape accuracy, and durability, the container of the present invention is useful as a container used in a stereolithography apparatus.

DESCRIPTION OF REFERENCE NUMERALS

1 Stereolithography apparatus
2 Container
2' Bottom
2'a Bottom face

3 Photocurable composition
4 Active energy beam
5 Active energy beam irradiation apparatus
6 Portion included in photocurable composition and located between bottom (2') and object production plate (7)
7 Object production plate
8 Actuator
9 Logic circuit control

The invention claimed is:

1. A container for holding a photocurable composition, wherein the container is used in a stereolithography apparatus, an active energy beam irradiation apparatus, and an actuator, wherein
the container comprises a bottom and a wall,
the bottom comprises a first layer comprising a hard resin, a second layer comprising a soft resin, and a third layer comprising a fluorine resin,
the second layer is laminated on the first layer and the third layer is laminated on the second layer,
the pencil hardness measured according to JIS K 5600-5-4:1999 for the first layer is 3B or harder,
the hardness measured for the second layer using a type A durometer according to JIS K 6253-3:2012 is from 10 to 90,
the third layer has a thickness of from 0.1 to 5.0 mm, and
a ratio of an area expressed in $cm^2$ of a bottom face on an inner face side of the container to a thickness expressed in cm of the bottom of the container is from 100 to 10000 cm.

2. The container according to claim 1, wherein the hard resin is at least one selected from the group consisting of acrylic, polycarbonate, polyester, polystyrene, polypropylene, polymethylpentene, and polycycloolefin.

3. The container according to claim 1, wherein the soft resin is at least one selected from the group consisting of a silicone, an acrylic elastomer, a polyolefin elastomer, and a styrene elastomer.

4. The container according to claim 1, wherein
a thickness of the first layer is from 0.5 to 25 mm and
a thickness of the second layer is from 0.01 to 25 mm.

5. The container according to claim 1, wherein
the second layer is 0.1 to 5 times thicker than the first layer and
the third layer is 0.01 to 5 times thicker than the second layer.

* * * * *